United States Patent
Liu et al.

(10) Patent No.: US 11,215,905 B2
(45) Date of Patent: Jan. 4, 2022

(54) AUTOMATIC TEMPERATURE-SENSING AND HEATING CAMERA MODULE

(71) Applicant: GUANGDONG HONGJING OPTOELECTRONIC TECHNOLOGY INC., Zhongshan (CN)

(72) Inventors: Jiajun Liu, Zhongshan (CN); Xicai Zheng, Zhongshan (CN); Zhenting Liu, Zhongshan (CN); Yi Liu, Zhongshan (CN); Zegang Long, Zhongshan (CN)

(73) Assignee: GUANGDONG HONGJING OPTOELECTRONIC TECHNOLOGY INC., Zhongshan (CN)

( * ) Notice: Subject to any disclaimer, the term of this patent is extended or adjusted under 35 U.S.C. 154(b) by 0 days.

(21) Appl. No.: 17/362,882

(22) Filed: Jun. 29, 2021

(65) Prior Publication Data

US 2021/0325765 A1    Oct. 21, 2021

Related U.S. Application Data

(63) Continuation of application No. PCT/CN2019/126532, filed on Dec. 19, 2019.

(30) Foreign Application Priority Data

Jun. 5, 2019 (CN) ............ 201910485048.9
Aug. 26, 2019 (CN) ............ 201910788108.4

(51) Int. Cl.
*H04N 5/225* (2006.01)
*G03B 17/55* (2021.01)

(52) U.S. Cl.
CPC .......... *G03B 17/55* (2013.01); *H04N 5/2252* (2013.01)

(58) Field of Classification Search
CPC .................................... H04N 5/2252
(Continued)

(56) References Cited

FOREIGN PATENT DOCUMENTS

| CN | 104483762 A | 4/2015 |
|---|---|---|
| CN | 206096730 U | 4/2017 |

(Continued)

OTHER PUBLICATIONS

International Search Report issued in corresponding International application No. PCT/CN2019/126532, dated Mar. 25, 2020.

(Continued)

*Primary Examiner* — Joel W Fosselman (57) ABSTRACT

An embodiment of the present disclosure discloses an automatic temperature-sensing and heating camera module at least comprising a lens barrel, a first lens arranged at a front end of the lens barrel, a gland that cooperates with the front end of the lens barrel for locking the first lens on the lens barrel, and a heating sheet capable of heating the first lens, wherein a gland flange is arranged at a rear end of the gland, and the heating sheet is arranged in close contact with the gland flange. In the automatic temperature-sensing and heating camera module according to the embodiment of the present disclosure, the heating sheet is arranged in close contact with the gland flange, so heat is transferred to the first lens through the gland flange, which has the advantages of simple structure and good heating effect, and is conducive to miniaturize the whole module. Besides, the automatic temperature-sensing and heating camera module can achieve automatic defrosting and defogging effects in cold (Continued)

or humid weather conditions or environments, which is suitable for vehicle mounted lens, outdoor monitoring and many other fields.

11 Claims, 5 Drawing Sheets

(58) Field of Classification Search
USPC .......................................................... 348/373
See application file for complete search history.

(56) References Cited

FOREIGN PATENT DOCUMENTS

| CN | 107703702 | * | 2/2018 |
|---|---|---|---|
| CN | 107703702 A | | 2/2018 |
| CN | 110095921 A | | 8/2019 |
| CN | 110501864 A | | 11/2019 |

OTHER PUBLICATIONS

Written Opinion of the international Search Authority in corresponding International application No. PCT/CN2019/126532.

* cited by examiner

FIG. 7 ved lens, comprises a lens barrel 1, a first lens arranged at a front end of the lens barrel 1, and a gland 2 that cooperates with the front end of the lens barrel 1 for locking the first lens on the lens barrel 1, and a heating sheet 3 capable of heating the first lens, wherein a gland flange 21 is further arranged at a rear end of the gland 2, and the heating sheet 3 is arranged in close contact with the gland flange 21. A pressure locking ring is arranged on the lens barrel 1 and under the gland flange, and the heating sheet is arranged between the gland flange and the pressure locking ring. A first compressing convex rim is arranged on the pressure locking ring at a radial inner side corresponding to the gland flange, a second compressing convex rim is arranged at a radial outer side of the pressure locking ring, and an annular groove is formed between the first compressing convex rim and the second compressing convex rim. The first compressing convex rim is pressed and locked on an inner edge of the lower surface of the heating sheet, and the second compressing convex rim is pressed and locked on an outer edge of the lower surface of the heating sheet.

AUTOMATIC TEMPERATURE-SENSING AND HEATING CAMERA MODULE

TECHNICAL FIELD

The present disclosure relates to an automatic temperature-sensing and heating camera module.

RELATED ART

An existing auto-heating camera module has disadvantages of large volume and complex structure.

SUMMARY

An embodiment of the present disclosure provides an automatic temperature-sensing and heating camera module to overcome the problem that the existing auto-heating camera module has disadvantages of large volume and complex structure.

An automatic temperature-sensing and heating camera module, at least comprises a lens barrel, a first lens arranged at a front end of the lens barrel, and a gland that cooperates with the front end of the lens barrel for locking the first lens on the lens barrel, and a heating sheet capable of heating the first lens, wherein a gland flange is further arranged at a rear end of the gland, and the heating sheet is arranged in close contact with the gland flange. A pressure locking ring is arranged on the lens barrel and under the gland flange, and the heating sheet is arranged between the gland flange and the pressure locking ring. A first compressing convex rim is arranged on the pressure locking ring at a radial inner side corresponding to the gland flange, a second compressing convex rim is arranged at a radial outer side of the pressure locking ring, and an annular groove is formed between the first compressing convex rim and the second compressing convex rim. The first compressing convex rim is pressed and locked on an inner edge of the lower surface of the heating sheet, and the second compressing convex rim is pressed and locked on an outer edge of the lower surface of the heating sheet.

The embodiment of the present disclosure further provides another automatic temperature-sensing and heating camera module.

An automatic temperature-sensing and heating camera module at least comprises a lens barrel, a first lens arranged at a front end of the lens barrel, and a gland that cooperates with the front end of the lens barrel for locking the first lens on the lens barrel, and a heating sheet capable of heating the first lens, wherein a gland flange is further arranged at a rear end of the gland, and the heating sheet is arranged in close contact with the gland flange. A lens barrel flange is arranged on the lens barrel and under the gland flange, and the heating sheet is arranged between the gland flange and the lens barrel flange. An annular protruding edge is provided on an outer periphery of an annular plane of the gland flange, the annular protruding edge and the annular plane jointly enclose an accommodating cavity, and the lens barrel flange is embedded in the accommodating cavity.

In the automatic temperature-sensing and heating camera module according to the embodiment of the present disclosure, the heating sheet is arranged in close contact with the gland flange, so heat is transferred to the first lens through the gland flange, which has the advantages of simple structure and excellent heating effect, and is conducive to miniaturize the whole module. Besides, the automatic temperature-sensing and heating camera module can achieve automatic defrosting and defogging effects in cold or humid weather conditions or environments, which is suitable for vehicle mounted lens, outdoor monitoring and many other fields.

BRIEF DESCRIPTION OF THE DRAWINGS

In order to explain the technical solutions in the embodiments of the present disclosure more clearly, a brief description will be made to the drawings used in the embodiments hereafter. Apparently, the drawings described below are merely some embodiments of the present disclosure. For those of ordinary skill in the art, other drawings can be obtained according to these drawings without any creative work.

DETAILED DESCRIPTION OF THE EMBODIMENTS

In order to make the technical problems, technical solutions, and beneficial effects solved by the present disclosure clearer, the present disclosure will be further described in detail below in conjunction with the drawings and embodiments. It should be understood that the specific embodiments described here are merely used to explain the present disclosure, but not to limit the present disclosure.

When ordinal numbers such as "first", "second", etc., are used in the embodiments of the present disclosure, unless they actually express the meaning of the order according to the contexts, they should be understood as merely for distinguishing purposes.

In the description of the present disclosure, it should be noted that, unless otherwise clearly specified and limited, the terms "arrange", "connect to" and "connect" should be interpreted broadly, for example, may be fixedly connected, detachably connected, or integrally connected; may be mechanically connected, or electrically connected; may be directly connected, or may be indirectly connected through an intermediate medium, and may be internally connected between two elements. The specific meanings of the above terms in the present disclosure can be understood according to specific cases by those skilled in the art. For those of ordinary skill in the art, the specific meanings of the above-mentioned terms in the present disclosure can be understood in specific situations.

Embodiment 1

Figure 1:
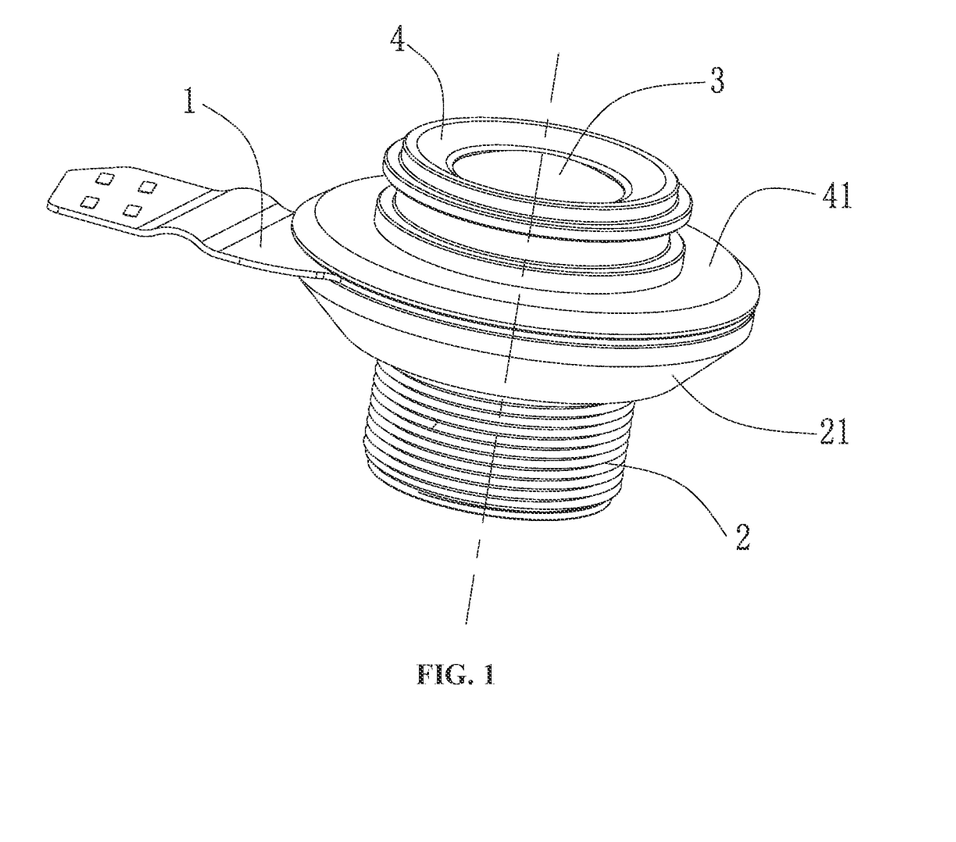
FIG. 1 is a schematic structural view of an automatic temperature-sensing and heating camera module according to embodiment 1 of the present disclosure.

As shown in FIG. 1, an automatic temperature-sensing and heating camera module, especially an externally embedded automatic temperature-sensing and heating camera module, at least comprises a lens barrel 2, a first lens 3 arranged at a front end of the lens barrel 2, and a gland 4 that cooperates with the front end of the lens barrel 2 for locking the first lens 3 on the lens barrel 2, and a heating sheet 1 capable of heating the first lens 3. A gland flange 41 is further arranged at a rear end of the gland 4, and the heating sheet 1 is arranged in close contact with the gland flange 41.

In the automatic temperature-sensing and heating camera module according to the embodiment of the present disclosure, the heating sheet is arranged in close contact with the gland flange, so heat is transferred to the first lens through the gland flange, which has the advantages of simple structure and good heating effect, and is conducive to miniaturize the whole module. Besides, the automatic temperature-sensing and heating camera module can achieve automatic defrosting and defogging effects in cold or humid weather conditions or environments, which is suitable for vehicle mounted lens, outdoor monitoring and many other fields.

Further, as a preferred embodiment of the present disclosure but not for limitation, a pressure locking ring 21 is arranged on the lens barrel 2 and under the gland flange 41, and the heating sheet 1 is arranged between the gland flange 41 and the pressure locking ring 21. The structure is simple, and the heating defrosting and defogging effects are excellent, which is conducive to miniaturize the design of the camera module.

Still further, as a preferred embodiment of the present disclosure but not for limitation, a lower surface of the gland flange 41 is also provided with an annular plane, and an upper surface of the heating sheet 1 is in contact with the annular plane, thus the heating effect is excellent.

Figure 2:
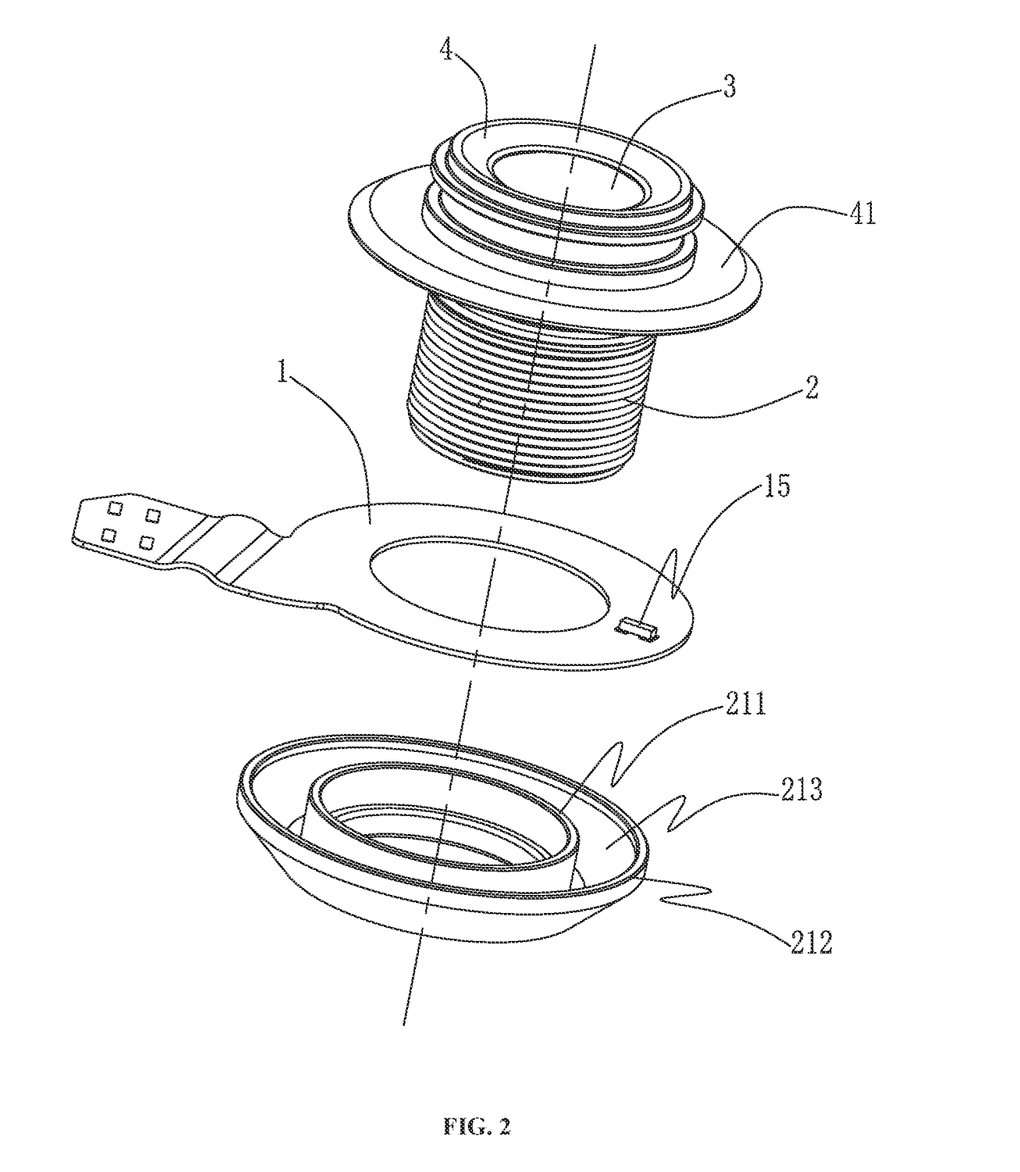
FIG. 2 is a structural exploded view of the automatic temperature-sensing and heating camera module according to embodiment 1 of the present disclosure.

Still further, as a preferred embodiment of the present disclosure but not for limitation, as shown in FIG. 2, a first compressing convex rim 211 is provided on the pressure locking ring 21 at a radial inner side corresponding to the gland flange 41, a second compressing convex rim 212 is provided at a radial outer side of the pressure locking ring 21, and an annular groove 213 is formed between the first compressing convex rim 211 and the second compressing convex rim 212. The first compressing convex rim 211 is pressed and locked on an inner edge of the lower surface of the heating sheet 1, and the second compressing convex rim 212 is pressed and locked on an outer edge of the lower surface of the heating sheet 1. The structure is simple.

Furthermore, as a preferred embodiment of the present disclosure but not for limitation, as shown in FIG. 1, an outer diameter of the second compressing convex rim 212 is equal to an outer diameter of the gland flange 41, so that the second compressing convex rim 212 matches the size of the outer circumference of the gland flange 41, and the structure is simple.

Still further, as a preferred embodiment of the present disclosure but not for limitation, the pressure locking ring 21 has a cone shape with a big top and a small bottom, which is an independent sleeve locking-pressing member and spirally sleeved on the outer periphery of the lens barrel 2 from the bottom to the top. The structure is simple.

Figure 3:
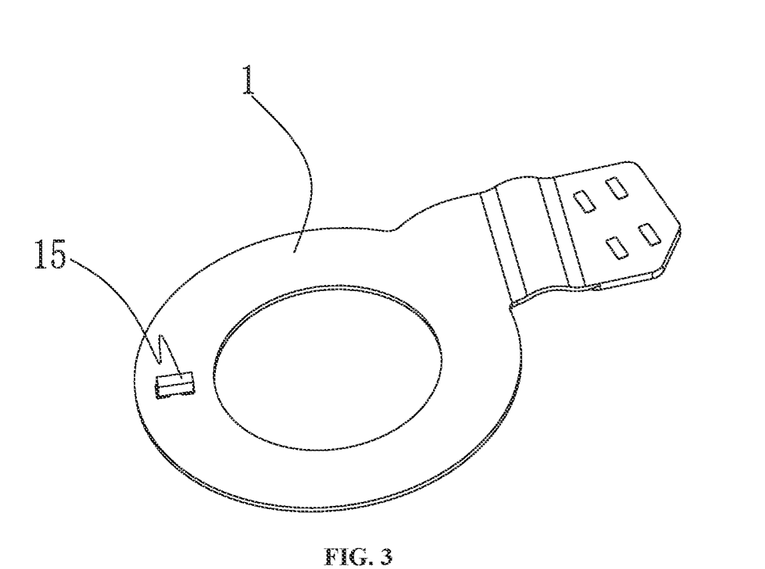
FIG. 3 is a schematic structural view of a heating sheet according to an embodiment of the present disclosure.

Still further, as a preferred embodiment of the present disclosure but not for limitation, as shown in FIG. 2 and FIG. 3, the heating sheet 1 is provided with a temperature detecting sensor 15 which is an NTC thermistor arranged within the annular groove 213 between the first compressing convex rim 211 and the second compressing convex rim 212, and the structure is simple and compact.

Figure 4:
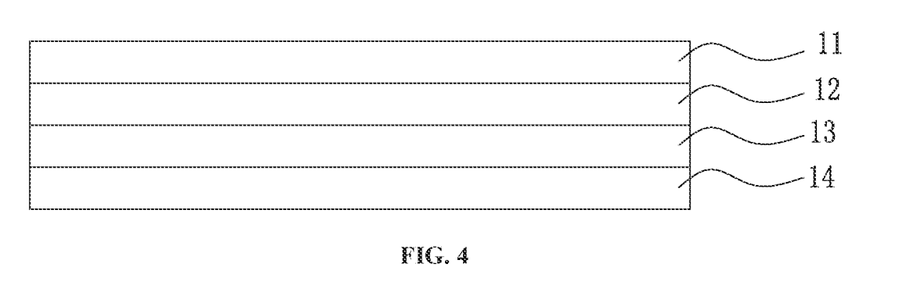
FIG. 4 is a cross-sectional structural view of the heating sheet according to the embodiment of the present disclosure.

Still further, as a preferred embodiment of the present disclosure but not for limitation, as shown in FIG. 3 and FIG. 4, the heating sheet 1 includes a PI film layer 11, a metal conductive heating layer 12, a temperature-sensing and variable-resistance ink layer 13 and a PI film layer 14 that are arranged in sequence from the top to the bottom. The temperature-sensing and variable-resistance ink layer 13 is used to detect a temperature signal of the heating sheet 1 and change its own resistance according to the temperature signal, thus to change the heat generation amount of the metal conductive heating layer 12. The heating sheet 1 can automatically adjust the heat generation amount directly through its own temperature-sensing and variable-resistance ink layer 13, which is convenient to use.

Still further, as a preferred embodiment of the present disclosure but not for limitation, the metal conductive heating layer 12 is connected in series with the temperature-sensing and variable-resistance ink layer 13, and the metal conductive heating layer 12 is isolated from the temperature-sensing and variable-resistance ink layer 13 by an insulating treatment or by an insulating layer. The structure is simple, and the heat generation amount can be adjusted automatically after being energized.

Still further, as a preferred embodiment of the present disclosure but not for limitation, the metal conductive heating layer 12 is an iron-chromium-aluminum foil layer or a copper foil layer, which has a simple structure and high thermal efficiency.

Furthermore, as a preferred embodiment of the present disclosure but not for limitation, the temperature-sensing and variable-resistance ink layer 13 is made of polycrystalline ceramic material and one or more materials of carbon black, graphite, or graphene. The structure is simple.

Still further, as a preferred embodiment of the present disclosure but not for limitation, a resistance value R of the temperature-sensing and variable-resistance ink layer 13 increases with an increasing temperature value T, and the resistance value R of the temperature-sensing and variable-resistance ink layer 13 decreases with the decreasing temperature value T. The structure is simple.

Furthermore, as a preferred embodiment of the present disclosure but not for limitation, an entire thickness of the heating sheet 1 is 0.5~2.5 mm, which is simple in structure and convenient for use.

Still further, as a preferred embodiment of the present disclosure but not for limitation, as shown in FIG. 3, the heating sheet 1 has a ring shape, which is simple in structure and sleeved on the lens barrel conveniently.

Embodiment 2

Figure 5:
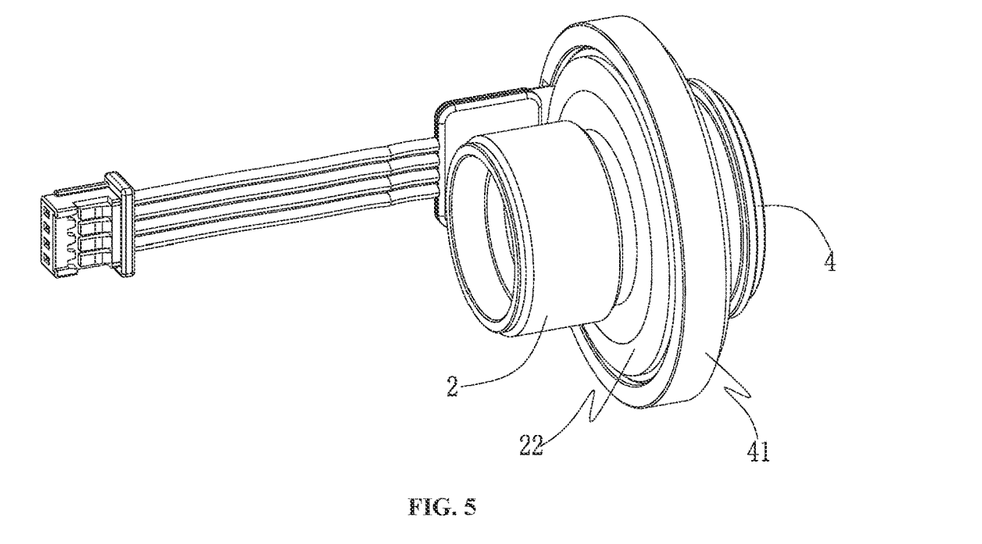
FIG. 5 is a schematic structural view of an automatic temperature-sensing and heating camera module according to embodiment 2 of the present disclosure.
Figure 6:
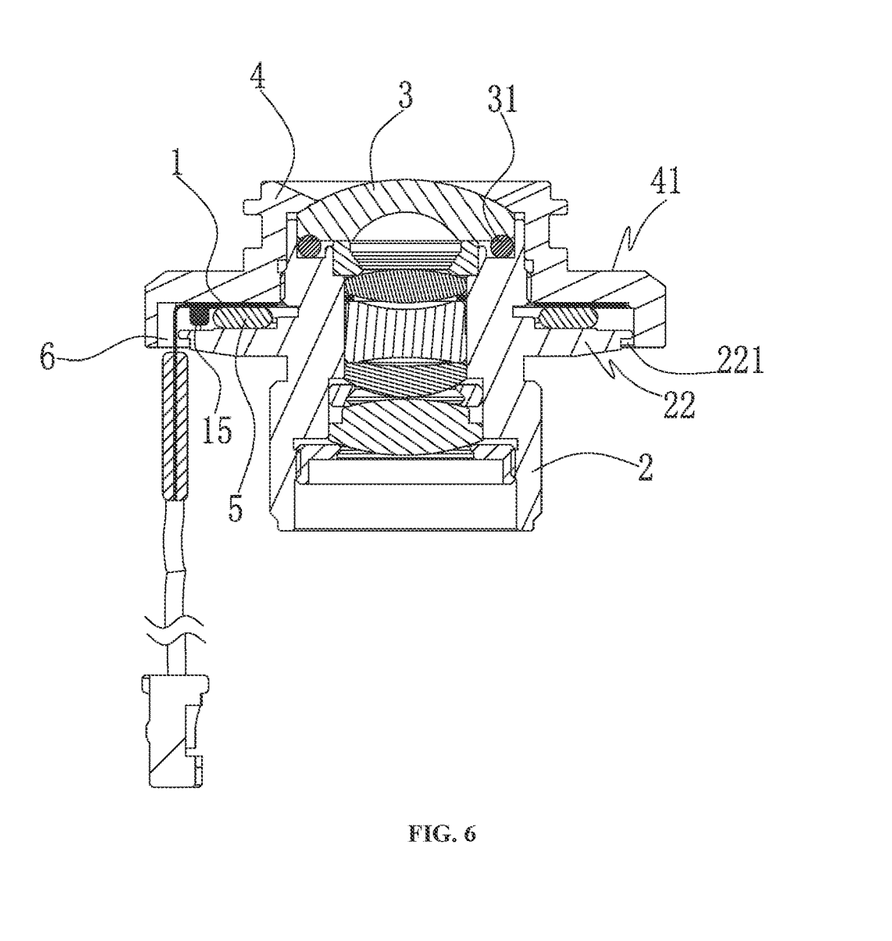
FIG. 6 is a structural cross-sectional view of the automatic temperature-sensing and heating camera module according to embodiment 2 of the present disclosure.
Figure 7:
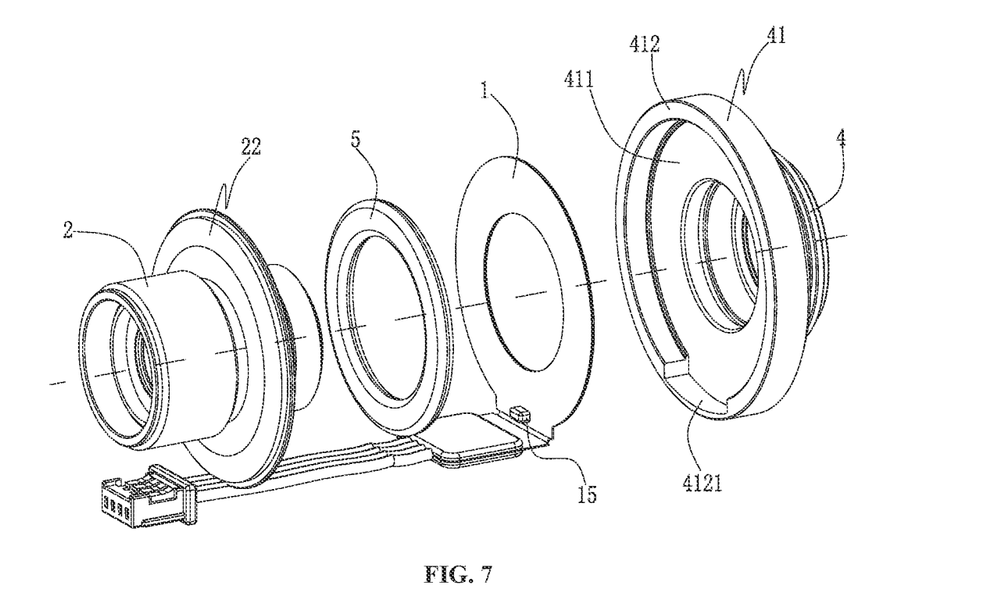
FIG. 7 is a structural exploded view of the automatic temperature-sensing and heating camera module according to embodiment 2 of the present disclosure.

An automatic temperature-sensing and heating camera module, in particularly an embedded automatic temperature-sensing and heating camera module is provided in the Embodiment 2. As shown in FIG. 5 to FIG. 7, unlike the Embodiment 1, an annular protruding edge 412 is provided on an outer periphery of an annular plane 411 of a gland flange 41 of a gland 4 in the embedded automatic temperature-sensing and heating camera module, and the annular protruding edge 412 and the annular plane 411 jointly enclose an accommodating cavity. A lens barrel flange 22 is further provided on the lens barrel 2 and under the gland flange 41, and embedded in the accommodating cavity. The structure is simple and compact.

Further, as a preferred embodiment of the present disclosure but not for limitation, as shown in FIG. 6 and FIG. 7, the lens barrel flange 22 decreases radially outwardly, and the annular protruding edge 412 of the gland flange 41 covers a circumferential outer edge of the lens barrel flange 22. The structure is simple and compact, which is conducive to seal to achieve waterproof and dust-proof functions.

Still further, as a preferred embodiment of the present disclosure but not for limitation, as shown in FIG. 6 and FIG. 7, an annular silicone sheet 5 is provided between a lower surface of the heating sheet 1 and an upper surface of the lens barrel flange 22, and the structure is simple.

Still further, as a preferred embodiment of the present disclosure but not for limitation, as shown in FIG. 6 and FIG. 7, an inner side of the annular protruding edge 412 of the gland flange 41 is recessed to form an arc-shaped groove 4121, and a notch 6 is formed between the arc-shaped groove 4121 and a circumferential external edge of the lens barrel flange 22 for a bending portion of a circuit board on a heating sheet 1 to pass through. The structure is simple and compact.

Furthermore, as a preferred embodiment of the present disclosure but not for limitation, the notch 6 can be sealed by black glue or waterproof glue (not shown), thus to achieve dust-proofing and waterproofing functions.

Still further, as a preferred embodiment of the present disclosure but not for limitation, as shown in FIG. 6 and FIG. 7, the lower surface of the heating sheet 1 is provided with a temperature detecting sensor 15 which is an NTC thermistor. The sensor 15 is arranged at a position corresponding to the arc-shaped groove 4121, and located between the arc-shaped groove 4121 and the annular silicone sheet 5, thus the structure is simple and compact.

Still further, as a preferred embodiment of the present disclosure but not for limitation, as shown in FIG. 6 and FIG. 7, the lens barrel flange 22 is also provided with an annular sealing groove 221 at the lower surface close to the outer side. The annular sealing groove 221 can be sealed by UV waterproof glue, thus to achieve waterproof and dust-proof functions between the lens barrel flange 22 and the annular protruding edge 412 of the gland flange 41.

Still further, as a preferred embodiment of the present disclosure but not for limitation, as shown in FIG. 6 and FIG. 7, the lens barrel flange 22 is roughly arranged at the middle of the outer periphery of the lens barrel 2, which has a simple structure.

Furthermore, as a preferred embodiment of the present disclosure but not for limitation, as shown in FIG. 6 and FIG. 7, the lens barrel flange 22 is integrally formed on the lens barrel 2, which has a simple structure.

Still further, as a preferred embodiment of the present disclosure but not for limitation, as shown in FIG. 6, a groove is provided on a front end surface of the lens barrel 2, and an outer side wall of the groove is longer than an inner side wall. The first lens 3 is embedded in a space enclosed by the outer side wall of the groove, and a sealing ring 31 is arranged between an image side surface of the first lens 3 and the groove. With the structural design of the sealing ring 31 and the groove at the front end surface of the lens barrel 2, the waterproof sealing between the first lens 3 and the lens barrel 2 is achieved, and the waterproof and dust-proof effects are excellent.

The above description is one or more implementation manners provided in combination with specific contents, and the specific implementations of the present disclosure are not limited to these described descriptions. Any approximations or similarities with the methods, structures and so on of the present disclosure, or several technical deductions or substitutions made under the concept of the present disclosure, should be regarded as the protection scope of the present disclosure.

What is claimed is:

1. An automatic temperature-sensing and heating camera module, at least comprising a lens barrel, a first lens arranged at a front end of the lens barrel, and a gland that cooperates with the front end of the lens barrel for locking the first lens on the lens barrel, and a heating sheet capable of heating the first lens, wherein
a gland flange is further arranged at a rear end of the gland, and the heating sheet is arranged in close contact with the gland flange;
a pressure locking ring is arranged on the lens barrel and under the gland flange, and the heating sheet is arranged between the gland flange and the pressure locking ring;
a first compressing convex rim is arranged on the pressure locking ring at a radial inner side corresponding to the gland flange, and a second compressing convex rim is arranged on a radial outer side of the pressure locking ring; an annular groove is formed between the first compressing convex rim and the second compressing convex rim; the first compressing convex rim is pressed and locked on an inner edge of the lower surface of the heating sheet, and the second compressing convex rim is pressed and locked on an outer edge of the lower surface of the heating sheet.

2. The automatic temperature-sensing and heating camera module according to claim 1, wherein the gland flange is provided with an annular plane at a lower surface, and an upper surface of the heating sheet is in contact with the annular plane.

3. The automatic temperature-sensing and heating camera module according to claim 1, wherein the heating sheet includes a PI film layer, a metal conductive heating layer, a temperature-sensing and variable-resistance ink layer and a PI film layer that are arranged in sequence from the top to the bottom; the metal conductive heating layer is connected in series with the temperature-sensing and variable-resistance ink layer.

4. The automatic temperature-sensing and heating camera module according to claim 3, wherein the temperature-sensing and variable-resistance ink layer is made of polycrystalline ceramic material and one or more materials of carbon black, graphite, or graphene.

5. An automatic temperature-sensing and heating camera module, at least comprising a lens barrel, a first lens arranged at a front end of the lens barrel, and a gland that cooperates with the front end of the lens barrel for locking the first lens on the lens barrel, and a heating sheet capable of heating the first lens, wherein
a gland flange is further arranged at a rear end of the gland, and the heating sheet is arranged close to the gland flange;
a lens barrel flange is arranged on the lens barrel and under the gland flange, and the heating sheet is arranged between the gland flange and the lens barrel flange;
an annular protruding edge is provided on an outer periphery of an annular plane of the gland flange, the annular protruding edge and the annular plane jointly enclose an accommodating cavity, and the lens barrel flange is embedded in the accommodating cavity.

6. The automatic temperature-sensing and heating camera module according to claim 5, wherein the lens barrel flange gradually decreases radially outwards, and the annular protruding edge of the gland flange covers a circumferential external edge of the lens barrel flange.

7. The automatic temperature-sensing and heating camera module according to claim 6, wherein an annular silicone sheet is arranged between a lower surface of the heating sheet and an upper surface of the flange of the lens barrel.

8. The automatic temperature-sensing and heating camera module according to claim 5, wherein an inner side of the annular protruding edge of the gland flange is recessed to form an arc-shaped groove, and a notch is formed between the arc-shaped groove and a circumferential external edge of the lens barrel flange of the lens barrel for a bending portion of the heating sheet circuit board to pass through.

9. The automatic temperature-sensing and heating camera module according to claim 8, wherein the gland flange is provided with an annular plane at a lower surface, and an upper surface of the heating sheet is in contact with the annular plane.

10. The automatic temperature-sensing and heating camera module according to claim 9, wherein the heating sheet includes a PI film layer, a metal conductive heating layer, a temperature-sensing and variable-resistance ink layer and a PI film layer that are arranged in sequence from the top to the bottom; the metal conductive heating layer is connected in series with the temperature-sensing and variable-resistance ink layer.

11. The automatic temperature-sensing and heating camera module according to claim 10, wherein the temperature-sensing and variable-resistance ink layer is made of polycrystalline ceramic material and one or more materials of carbon black, graphite, or graphene.

* * * * *